(No Model.) 2 Sheets—Sheet 2.

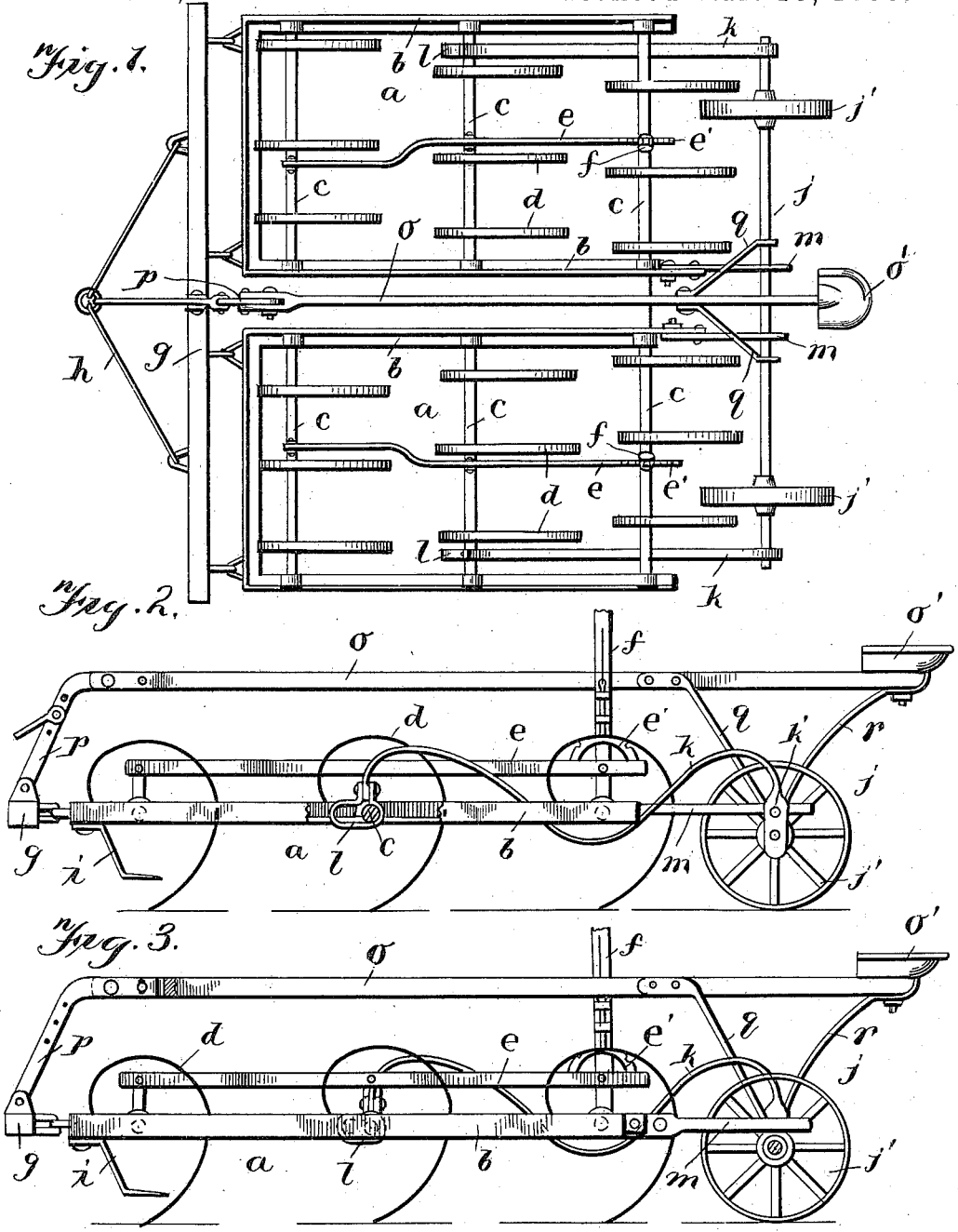

E. E. WHIPPLE.
WHEELED ATTACHMENT FOR HARROWS.

No. 600,660. Patented Mar. 15, 1898.

Witnesses
Geo. E. Fuch.
Chas. R. Wright Jr.

Inventor
E. E. Whipple.
Hubert A. Beck
Attorney

THE NORRIS PETERS CO., PHOTO-LITHO., WASHINGTON, D. C.

UNITED STATES PATENT OFFICE.

EFFINGER E. WHIPPLE, OF COOPERSTOWN, NEW YORK.

WHEELED ATTACHMENT FOR HARROWS.

SPECIFICATION forming part of Letters Patent No. 600,660, dated March 15, 1898.

Application filed January 19, 1897. Serial No. 619,773. (No model.)

*To all whom it may concern:*

Be it known that I, EFFINGER E. WHIPPLE, a citizen of the United States, residing at Cooperstown, in the county of Otsego and State of New York, have invented certain new and useful Improvements in Riding or Wheeled Attachments for Harrows; and I do hereby declare the following to be a full, clear, and exact description of the invention, such as will enable others skilled in the art to which it appertains to make and use the same.

This invention relates to certain improvements in riding or wheel attachments for harrows.

Among other novel features pointed out and claimed hereinafter I claim, broadly, to be the first to invent a wheeled attachment provided with axle extending substantially the entire width of the various sections composing the harrow, with supports extending into engagement with the harrow and the axle, by means of which the sections composing the harrow, with other means hereinafter described, always carry the frame-sections in an elevated position above the ground and at the same time leave the independent sections free to be moved or to move above the horizontal line of the support, combining the advantages of wheel and float harrow without carrying the weight of the riding attachment when the frames are elevated above the line of the support.

The invention consists in certain novel features in construction and in combination and in arrangements of parts, as more fully and particularly described and pointed out hereinafter.

Figure 6:
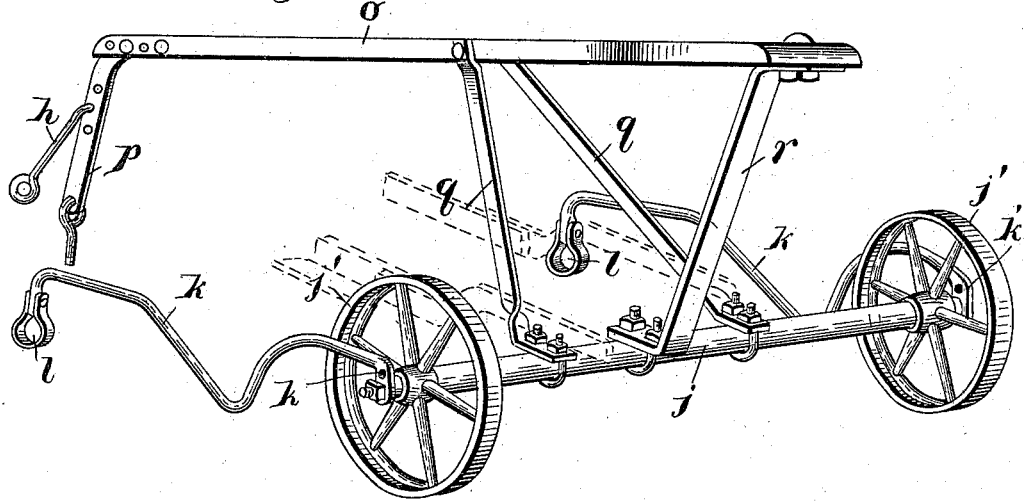
Figure 7:
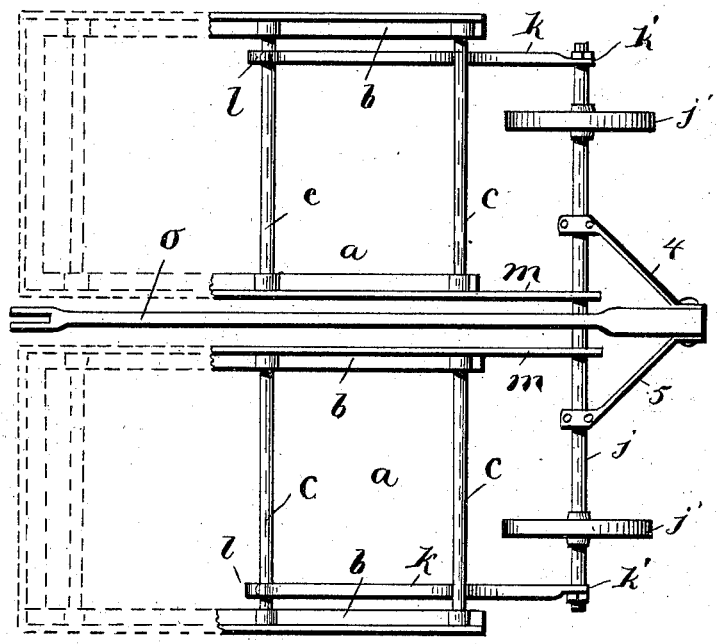

Referring to the accompanying drawings, Figure 1 is a top plan view of a two-section lever-adjustable harrow having a form of my improved wheeled support applied thereto. Fig. 2 is a side elevation showing the teeth down in operative position. Fig. 3 is a side elevation, parts in section, the two sections being separated on the line 3 3, Fig. 1. Fig. 4 is a detail view with the front end of the tongue broken away. Fig. 5 is a detail view of portions of a frame-bar and its rear extension. Fig. 6 is a detail perspective of a wheeled support which can be made and sold independently for attachment to harrows in the hands of the users, dotted lines showing positions of frame extensions above the support. Fig. 7 is a detail top plan of a wheeled support, showing a different arrangement of tongue-supporting braces, dotted lines showing harrow-frame bars, with the inner bars elongated to extend over the wheeled support.

In the drawings, $a\ a$ are the sections of a harrow, each comprising the frame-bars $b$, to which the rocking tooth-bars $c$ are confined.

$d$ are the teeth, suitably secured to the tooth-bars to be raised and lowered by rocking the same. The tooth-bars of each section are rocked simultaneously and locked with the teeth in the desired position by the adjusting and connecting bar $e$, connected with the various tooth-bars, as usual, or in any other well-known manner and having a rack $e'$ beside the hand-lever $f$, extending up from and rigid with a rear tooth-bar and having a spring hand-clip-controlled pawl to engage the rack and lock the parts in the desired positions. This tooth operating and adjusting device is the arrangement usually employed in harrows of this class; but my invention is not limited to any particular means or arrangement for raising and lowering the teeth.

In the particular form of harrow selected to illustrate the application of my invention an evener-bar $g$ is arranged in front of the harrow-sections and the front ends of each harrow-section are loosely coupled thereto.

$h$ are the draft attachments coupled to the evener-bar and through the medium thereof connected to the harrow-sections.

Suitable supports, such as shoes $i$, can be arranged at the front ends of the harrow-frames to balance or uphold the frame.

$j$ is a rear support suitably carried a distance above the ground. This support preferably consists of a bar horizontally arranged in rear of all the sections of the harrow and provided with supporting-wheels $j'\ j'$ near its ends.

$k\ k$ are sustaining bars or supports, each at its rear end secured to an end of the bar or axle $j$, and extending forwardly beneath the rear tooth-bar of a harrow-section, and at its front end loosely coupled to a tooth-bar or other desired part of the harrow in advance of the rear tooth-bar. Thus it will be noted that the two sustaining bars or frames extend forwardly from and are secured to the opposite ends of the axle or supporting-bar and are at their front ends coupled to the two harrow-sections, each near the outer side or end of a tooth-bar of its respective harrow-section.

The outer end of each sustaining-bar can be provided with a vertical series of bolt-holes (see $k'$) to permit vertical adjustment of the same in relation to the supporting bar or axle, or other arrangements can be provided to permit the vertical adjustment of the sustaining-bars.

The front end of each sustaining-bar is preferably so coupled to the harrow as to permit limited play of the harrow or the wheeled support in the line of draft independently of each other. This is preferably attained by securing the sustaining-bar to a sleeve $l$, loose on the tooth-bar and elongated or enlarged horizontally and forwardly from the tooth-bar, so that the sleeve can move or slip horizontally in the line of draft on the tooth-bar and independently of the same.

The sustaining-bars are usually curved upwardly between the axle or supporting-bar and the rear tooth-bar, and also between the rear tooth-bar and the tooth-bar to which they are coupled, so that the portions of the sustaining-bars passing beneath the rear tooth-bars form downward curves and thus act as runners in traveling over, but not collecting trash, &c., and in addition the upwardly-curved portions prevent the sustaining-bars collecting and holding trash, &c., when the harrow is in operation.

At the inner sides of the harrow-sections portions of their frames are projected over the central or intermediate portion of the supporting-bar or axle. This is usually attained by extending the frame-bars at the inner or adjoining sides of the harrow-sections rearwardly, so as to project over and above the rear support, as the axle thereof.

If desired, extensions $m$, each preferably rigid within itself, are bolted to the rear ends of said frame-bars and extending rearwardly therefrom over the axle of the wheeled support, so as to form rigid continuations of the frames of the sections. If desired, these extensions can be adjustable vertically to correspond with the adjustment of the end sustaining-bars before described. A simple way of permitting this adjustment is by arranging the extension longitudinally beside the end of the frame-bar and providing the extension $m$ with the pivot-hole in advance of its front end and providing it with a vertical slot $m'$ near its front end, so that when the extension is beside the frame-bar on a pivot-bolt, with another bolt passed through said vertical slot, the rear end of the extension can be raised or lowered and clamped in the desired position by tightening the bolts passed through the end of the frame-bar and pinching the extension thereon. (See Fig. 5.) The support for the rear end of the harrow thus described can be used with or without a riding attachment; but under some circumstances it is desirable that the riding attachment be employed, and, referring to the riding device, $o$ is a draft-tongue carrying a seat $o'$ at or near its rear end and at the rear of the harrow and from thence extending forwardly above the harrow and so as not to interfere with the working of the same. The front end of the tongue extends downwardly and is at its lower end suitably and loosely coupled to the evener-bar or in any other manner suitably connected with or to the front part of the harrow.

$p$ is a draft connection extending down from an elevated point on the front end of the tongue to the draft connection to hold down the front end of the harrow. The rear end of the tongue extends over the central portion of the supporting-bar or axle and is supported thereby and a distance above the same by the braces $q$ at their upper ends secured to the tongue in advance of the seat and from thence extending downwardly and rearwardly and laterally in opposite directions and at their lower ends detachably bolted to the axle and also by the brace $r$ at its lower end bolted detachably to the axle and from thence extending upwardly and rearwardly and bolted to the tongue beneath the seat. It should at this point be also noted that the seat is so located that the occupant can easily reach both of the tooth-adjusting levers and swing them without the necessity of leaving his seat.

By reason of the loose connection between the sustaining-bars of the wheeled support and the tooth-bars the entire draft on the support is through the medium of the tongue and its connections with the draft devices of the harrow, and hence when the device is being applied to old lever-harrows or harrows already on the market it is desirable to have an adjustment to permit varying the length of the tongue, so that the sustaining-bars will not pull on the tooth-bars to which they are coupled, as might be the case if the tongue was too long. Various adjustments can be provided for this purpose. For instance, the tongue can be made in sections with the vertically-disposed front end thereof forming one section with a lateral extension between a longitudinal slot in the front end of the other section of the tongue. The rearward extension of the upright section is so pivoted in the slot that the lower end of the upright section will move back and forth in the line of draft as the section swings, thus shifting the point of junction with the evener-bar longitudinal of the plane of draft-tongue and varying the distance between the rear wheeled axle and the point at which the front end of the tongue is coupled. Suitable means can be provided for locking the upright section in the desired position in relation to the horizontal section of the tongue. For instance, a vertical slot can be formed in the rear end of the extension in the slot in the horizontal section and a bolt passed through the horizontal section and the slot in the extension, so as to lock the parts together. (See Fig. 4.) However, I do not limit myself to any peculiar means of adjusting the draft-tongue, as various means can be employed without departing from the spirit of my invention.

When desired, the draft-tongue can be easily detached and removed from the wheeled support, for, as before described, the braces are detachably bolted or otherwise secured to the axle, while detachable bolts are provided to couple the tongue to the evener-bar and the inclined draft connection to the tongue. When the draft-tongue is thus removed, the wheeled support receives its draft through the sustaining-bars, but in such a manner as to in no way detract from the efficiency of the device as a support for the rear end of the harrow when the teeth are elevated, nor does it prevent vertical swing and lateral play of the harrow when in action independently of the wheeled support.

When the harrow is in action with the teeth lowered and into the soil, the rear tooth-bars usually rest on the sustaining-bars and the rearward projections from the inner sides of the section-frames rest on the central or intermediate portion of the supporting-bar, whereby the digging depth of the teeth is limited and the frame is carried in the same horizontal plane above the ground.

When the teeth are not working their full depth, the tooth-bars and said portions of the frame are arranged above and out of engagement with the sustaining-bars and the supporting-bar, and when the teeth are raised from operative position the frames drop as the teeth go up and rest on and are supported by the supporting-bar and the sustaining-bars, while the front ends of the frames are supported by the shoes or other suitable means.

Each section is preferably supported on both sides and is thereby firmly held against tilting, while the strain is distributed along the supporting-bar and on both sides of each wheel. Also advantages are attained and the strain distributed throughout each section by having one side of a section bear down on a sustaining-bar or frame passing beneath a tooth-bar, while the opposite side of the frame extends over and rests on a supporting-bar.

When the teeth are thrown down into the ground, the harrow-frame travels back. Hence advantages are attained in having the free play in the couplings between the sustaining-bars and the intermediate tooth-bars, as such backward movement of the frame is permitted without corresponding movement of the wheeled support and the frames can move back the distance required independently of the wheeled support.

Among the material practical advantages of this invention are the extreme simplicity and durability of the construction and the fact that the device can be easily applied to harrows previously made or in use, with the supporting-bars any desired distance from the rear ends of the harrow-section and within or in rear of the rear harrow-teeth.

It should be understood that the form of harrow with curved teeth here illustrated is only shown for the sake of clearness, as my riding or wheeled attachment can be employed and attached to any lever-adjustable harrow or other cultivating implement. Also where implements are being manufactured to receive my attachment the inner frame-bars can be made longer, so as to extend over the wheeled support, as shown by dotted lines in Fig. 7, without the addition of adjustable or separate extensions. Also, as shown in Fig. 7, two braces 4 5 can be employed, secured to the draft-tongue beneath the seat and extending forwardly and downwardly to the axle or frame and there secured and spread at their lower ends. It should also be understood that my improved riding or wheeled attachment is particularly adapted for independent manufacture and sale to the users of various harrows, &c., as my invention does not relate to and is not limited to any particular harrow; nor do I intend to limit myself to any form or arrangement of the support for carrying or supporting the harrow-frame in a given horizontal plane.

It is evident that various changes can be made in the forms, construction, combination, and arrangements of the parts described without departing from the spirit and scope of my invention. Hence I do not limit myself to the construction herein specifically described for the sake of clearness, but consider myself entitled to all such changes and modifications as fall within the spirit and scope of my invention.

I consider myself entitled to any change, modification, or arrangement of the support for carrying and supporting the frame in any given plane above the ground and to permit the frame to move above the plane of the support without carrying the wheeled attachment and support with such elevated movement; nor do I consider it at all important what the form and arrangement of the support may be, whether arranged on the harrow-frame or on the riding attachment, so long as the engaging-points serve the purpose of supporting the frame in its elevated position.

Having thus fully described my invention, what I claim as new, and desire to secure by Letters Patent of the United States, is—

1. In combination, a rear wheeled support having slack connection with a harrow at a point in advance of its rear tooth-bars, and a draft-tongue from the support to the draft attachments of the harrow and by which the support receives its draft, said tongue adjustable in length to attain the proper slack in said connection, and a harrow, substantially as described.

2. A wheeled attachment, in combination with a harrow, said support disconnected from and arranged to limit the downward movement of the rear end of the harrow-frame, and a draft-tongue extending over the harrow and at the rear, supported on and carried by said support and at the front end loosely connected with the draft attachments of the harrow, said tongue adjustable so that the distance between the front attaching-point of the tongue and the support can be varied, substantially as described.

3. A rear wheeled attachment for a harrow having a support arranged to extend forward beneath the rear of the harrow and having a loose coupling or connection adapted for loose connection with a forward part of the harrow so as to permit a slight backward and forward movement of the harrow independent of the support, substantially as described.

4. A wheeled attachment, in combination with a lever-adjustable harrow, said attachment having a support extending forwardly beneath a rear tooth-bar of the harrow and coupled to the harrow in advance thereof and curved upwardly in front and in rear of said rear tooth-bar with the downward deflection beneath said tooth-bar and so that the support limits the downward movement of said tooth-bar and the rear end of the harrow, substantially as described.

5. A wheeled attachment, in combination with an adjustable-tooth harrow, said attachment having supports at their front ends coupled to the harrow in advance of the rear tooth-bars and passing down beneath and arranged to uphold the rear tooth-bars, said harrow having projections extending rearwardly over the support and arranged to rest thereon and limit the downward movement of the harrow, substantially as described.

6. A wheeled support, in combination with a two (or more) section lever-harrow, said support arranged in rear of the sections, supporting-bars from the ends of the support extending forwardly beneath the rear tooth-bars of the sections and at or near the outer sides thereof and loosely coupled to the sections, respectively, in advance of the rear tooth-bars, the inner sides of the frames of the sections extended rearwardly over the support, substantially as described.

7. A riding or wheeled trailing support for harrows and the like, comprising a wheeled bar or axle having sustaining-bars extending forwardly from its ends with attachments or couplings at their front ends, and each formed with an intermediate depression, substantially as described.

8. A wheeled attachment for harrows comprising a wheeled axle or frame having a bar extending forward for coupling with a harrow in advance of its rear end, and a forwardly-extending draft-tongue adapted for coupling with the front portion of the harrow or its draft devices, the forward end of the tongue deflected or extended downwardly and adjustably connected with the remaining length of the tongue to permit forwardly or rearwardly adjustment of the lower end of said forward downwardly-extended end of the tongue, substantially as described.

9. A wheeled attachment for harrows, in combination with a lever-adjustment harrow, the harrow having rearward projections or extensions from the inner portions of its frame extending over the attachment, and supporting-bars from the support extending forwardly and loosely coupled to intermediate tooth-bars near the outer sides of the harrow so that rear tooth-bars will be engaged by the supporting-bars, substantially as described.

10. A wheeled attachment for harrows having forwardly-extending sustaining-bars adapted for loose coupling to the harrow, the rear ends of the sustaining-bars having vertical portions secured to the end portions of the supporting attachment in vertical adjustment, substantially as described.

11. A wheeled attachment comprising an axle having wheels and a draft attachment, in combination with a turnable tooth-bar harrow having a portion extending over the axle, whereby the rear of the frame is carried in a horizontal plane above the ground leaving the frame free to be elevated above the horizontal plane of the support without carrying the wheeled attachment with it.

12. A harrow in combination with a wheeled axle having draft attachment and a support therefrom extending forwardly beneath and with a depression to receive a part of the harrow.

13. A lever curved-spring-tooth harrow provided with depending supports, in combination with a wheeled attachment, connected with the harrow draft and having a supporting-axle in length equal to substantially the width of the frame and extending under said frame for supporting the same in an elevated position above the ground, substantially as set forth.

14. A lever-adjustment harrow having portions of its frame vertically adjustable, in combination with a wheeled attachment connected with the draft of the harrow and having a support under some portions of the frame for supporting the frame in an elevated position above the ground whether the teeth are in or out of the soil and whereby the horizontal plane or elevation at which the harrow is supported can be varied by such adjustment.

15. A harrow, in combination with a wheeled attachment connected with the draft of the harrow and moving over the ground therewith and having a vertically-adjustable support for upholding or supporting the harrow-frame in an elevated plane above the ground whether the teeth are in or out of the soil and whereby the elevated plane in which the harrow-frame is supported can be raised or lowered by such adjustment.

In testimony whereof I affix my signature in presence of two witnesses.

EFFINGER E. WHIPPLE.

Witnesses:
FENNIMORE WHIPPLE,
HANNAH M. WHIPPLE.